Oct. 15, 1929.  W. J. COULTAS  1,731,453
TONGUE TRUCK
Filed Feb. 10, 1927
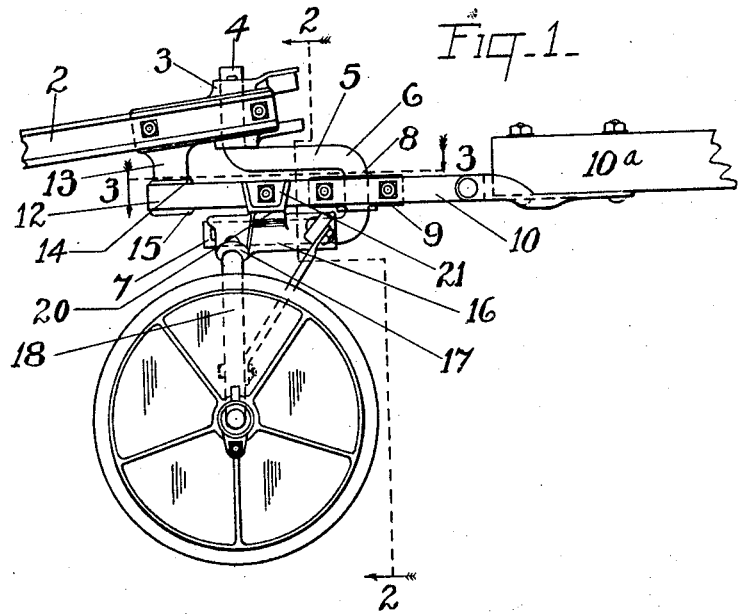
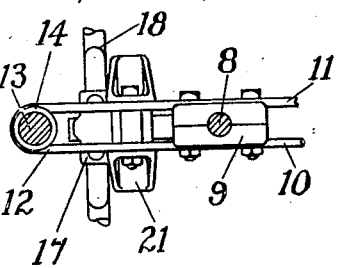
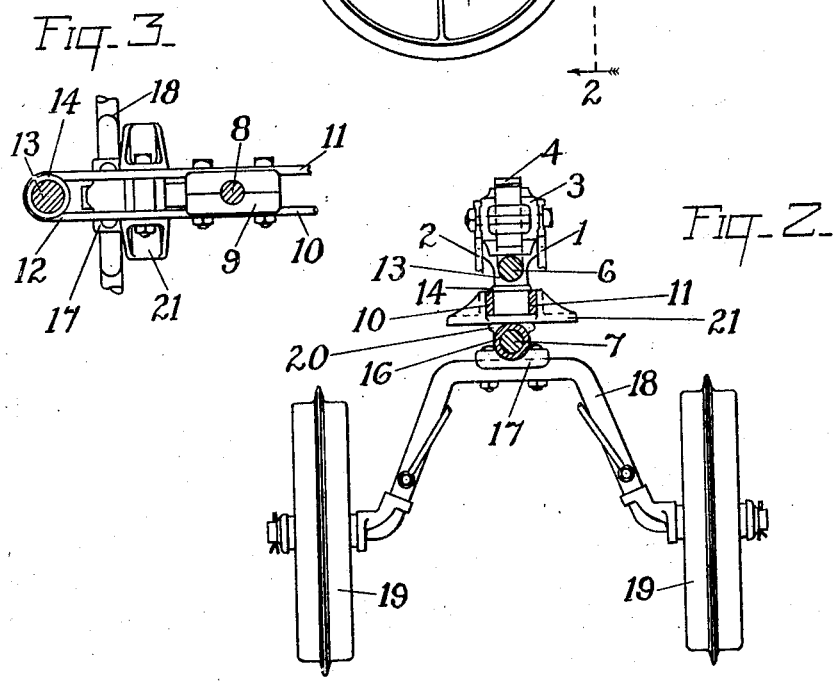
Inventor:
Wilbur J. Coultas
By W. C. Jindinston
Attorney Patented Oct. 15, 1929

1,731,453

UNITED STATES PATENT OFFICE

WILBUR J. COULTAS, OF MOLINE, ILLINOIS, ASSIGNOR TO DEERE & COMPANY, OF MOLINE, ILLINOIS, A CORPORATION OF ILLINOIS

TONGUE TRUCK

Application filed February 10, 1927. Serial No. 167,132.

My invention relates to steerable tongue trucks of that type particularly employed in supporting draft tongues of various types of agricultural implements, and has for its object to prevent lateral tilting of the truck irrespective of the position of the truck, whether moving ahead or steering to a new direction.

Referring to the drawings in which similar numerals indicate identical parts:

Figure 1 is a side elevation of a pole truck embodying my invention;

Figure 2 is a section on the line 2—2 of Figure 1, and

Figure 3 is a section on the line 3—3 of Figure 1.

A well known type of truck is shown and is represented supporting a stub tongue formed of parallel bars 1 and 2. A casting 3 is rigidly secured between the forward ends of the bars 1 and 2 and therein is a vertical bearing in which is journaled a spindle 4 integral with a crank support 5, the latter including arms 6 and 7 parallel in a vertical plane. The arms 6 and 7 are connected by a part 8 rotatably journaled in a bearing in a block 9. A horizontally disposed frame is formed with parallel parts 10 and 11, and between said parts the block 9 is rigidly bolted. The parts 10 and 11 extend forwardly of the block 9 to support a draft pole 10ª. The frame is made of a single bar bent centrally to form a loop 12 in which is loosely held a downwardly extending part 13 of the casting 3. The part 13 is freely movable longitudinally of the frame when the truck is steered to right or left, but vertical movement of the part 13, in the frame, is prevented by flanges 14 and 15 on the part 13, the flange 14 contacting with the upper edge of the said frame, and the flange 15 extending below the lower edge thereof.

On the spindle 7 of the crank 5 is loosely mounted a sleeve 16 having, preferably integral therewith, a laterally extending part 17 to which the vertically disposed arch axle 18 is securely bolted. The ends of the arch axle 18 are bent outwardly, forming spindles on which supporting wheels 19 are mounted. On the upper side of the sleeve 16 is a laterally extending part 20 having a flat horizontal upper surface in constant sliding contact with a similar but lower surface on a member 21 bolted to the frame bars 10 and 11 and extending outwardly therefrom to a greater distance than the part 20 from the sleeve 16.

When the pole 10ª is swung to change the direction of travel of the implement to which the truck is connected, the crank support 5 is turned on its pivotal part 4 and the wheels are simultaneously turned in the new direction. As shown in Figure 1, the pivot of the crank support 5 on the stub tongue is rearward of the pivotal connection of the support with the frame to which the pole 10ª is attached, and the pole frame is pivotally connected to the part 13 of the casting 3. It, therefore, follows that one of the pivotal points mentioned must be movable longitudinally of the device to permit a free movement of the parts when changing the direction of travel. Consequently, I have constructed the pole frame, preferably, of a single bar bent to present the bars 10 and 11 with the loop 12 of which the part 13 of the casting 3 is held loosely to permit the pole frame to move longitudinally thereon when a turn is made laterally in either direction.

It is evident that if the part 20 is omitted from the structure, the axle 18 will tilt freely unless a means is provided to prevent the sleeve 16, secured to the axle, from turning on the arm 7. But with my improvement secured to the sleeve and in flat contact with the under face of the member 21, the down pressure of the stub tongue holds the part 20 and the member 21 in constant contact, irrespective of the position of the truck, whether traveling straight ahead or steering to a different direction, and the part 20 and member 21 being so held, the sleeve 16 cannot turn; consequently, the axle cannot tilt to an appreciable degree notwithstanding a certain amount of play of the assembled parts, relative to each other, caused in their manufacture and allowing a sufficient and desirable flexibility.

What I claim is—

1. A steerable tongue truck for agricultural machines including an axle and supporting wheels, a stub tongue, a pole having a frame pivotally attached to the stub tongue, a crank support for the stub tongue pivotally connected thereto and to the frame and said axle, a sleeve rigidly secured on the axle, a spindle on the lower part of said support loosely mounted in said sleeve, said pole and frame adapted to be swung laterally and simultaneously swing said support to steer the wheels, a member rigidly secured to the frame and having an extended flat under surface, and a laterally extending part rigid on said sleeve having a flat surface in constant sliding contact with the under surface of said member whereby tilting of said axle is prevented irrespective of the steering operation.

2. A steerable tongue truck for agricultural machines including an axle and supporting wheels, a sleeve rigidly mounted on said axle and transversely thereof, a stub tongue, a draft device including a pole and frame pivotally connected to the stub tongue, a forwardly extending and vertically disposed crank support having a vertical spindle journaled on the stub tongue forwardly of the connection of said frame thereto, said crank having a vertical part at its forward termination pivotally journaled on said frame, an arm extending rearwardly from said part and loosely mounted in said sleeve whereby a lateral swinging movement of the pole and frame will simultaneously swing said support and steer the wheels, a member rigidly mounted on the frame and extending beyond the sides thereof, and having an under flat surface, and a laterally extending part on the upper part of said sleeve having a plane surface in constant slidable contact with the flat surface of said member whereby said axle is prevented from tilting.

WILBUR J. COULTAS.